F. A. Archibald,
Level.
№ 92,773.  Patented Jul. 20. 1869.
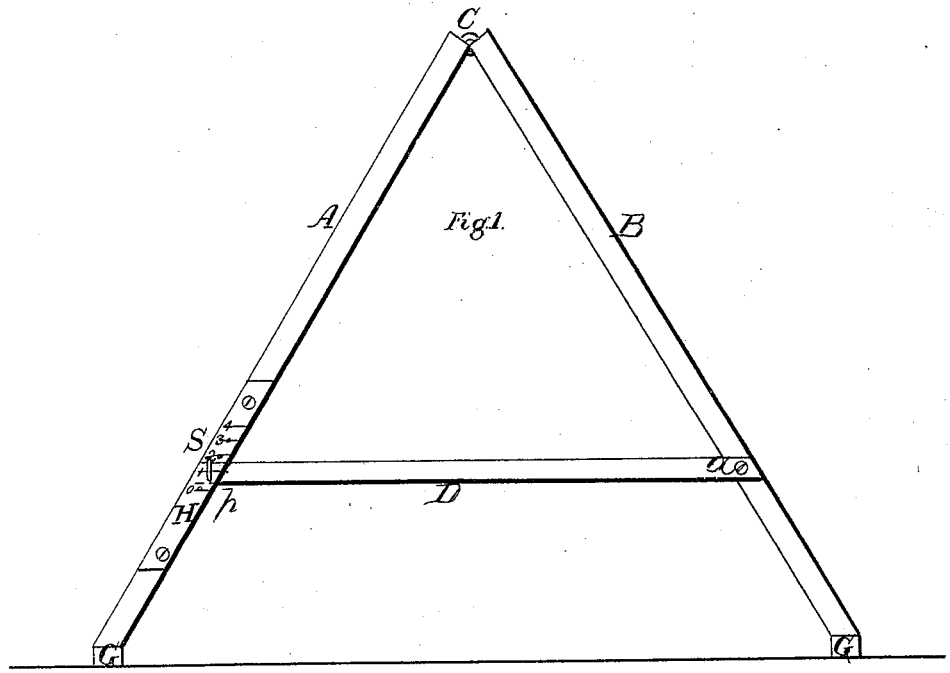
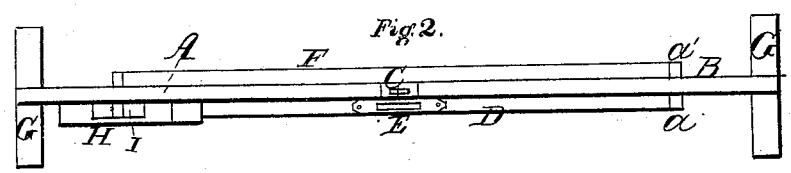

United States Patent Office.

F. A. ARCHIBALD, OF CONCORD, NORTH CAROLINA.

Letters Patent No. 92,773, dated July 20, 1869; antedated July 15, 1869.

IMPROVEMENT IN LAND-LEVEL AND MEASURE.

The Schedule referred to in these Letters Patent and making part of the same.

*To all whom it may concern:*

Be it known that I, F. A. ARCHIBALD, of Concord, in the county of Cabarras, and State of North Carolina, have invented certain new and useful Improvements in Land-Measures and Levels; and I do hereby declare that the following is a full, clear, and exact description thereof, reference being had to the accompanying drawings, and to the letters of reference marked thereon, which form a part of this specification, in which—

Figure 1 is a side view, and

Figure 2, a top view of my instrument for levelling and laying off ditches on hill-sides or on level ground.

My invention relates to certain improvements in levelling and laying off ditches on hill-sides or on level ground, so as to insure the same width of ditch, the advantages of which will hereinafter be more fully set forth.

In the accompanying drawings—

A B are two bars, hinged at c, and supported by the feet G, which are pivoted to the pieces A B, the object of which will hereinafter be more fully set forth.

To the bar or piece B are pivoted, at a and a', the two pieces D and F, the former of which is passed through a slot, I, in the bar H; the latter (H) being securely attached to the bar A.

On the outside of the bar H is a scale, S, numbered 0, 1, 2, 3, &c., and opposite each ordinal are holes, through which a pin may be inserted, the pin entering also a corresponding hole in the bar D and leg A.

The bar D is provided with a spirit-level on its top surface.

The feet G are attached to the legs or bars A B, in order to support the instrument when in operation, and are pivoted to said legs, that they may be turned in any direction, so that the general level of the land-surface may be obtained, regardless of the direction the instrument may be run in.

If the feet G are dispensed with, in running over rough land, much difficulty arises, as the lower end of one of the legs may rest on a ridge or clod, whilst the lower end of the other leg may rest on a ridge or furrow, and the instrument would not then rest on the general level of the land-surface. This difficulty is obviated by the employment of the long pivoted feet G G, which I attach to the legs A B.

In operating my instrument for levelling or obtaining the height of a hill or mountain, the foot G is placed at the starting-point, the bar D being opposite the zero-point of the scale, the leg B is placed on the ascent, the pin withdrawn from the hole in the piece H, and the bar D levelled by the spirit-level, when the pin is again inserted, and the height ascended read from the scale, when the same operation is repeated until the top of the ascent is reached.

The bar F is attached to the leg A by a pin and hole in each, and is employed to retain the connection with the legs during the levelling of the cross-bar D.

In laying off a ditch on level ground of a fixed width, the instrument is merely moved along the line of the ditch, and pins stuck at the points where the feet G rest.

This process, however, will not apply when the ground is hilly. In the latter case, when the foot G, of the leg B, is raised vertically on the ascending ground, the distance between the feet will be equal in length to the hypothenuse of a right-angled triangle, the base of which is the fixed width of the ditch.

The arms A and B being pivoted together at c, and there being pivoted connections between the cross-bars F and D and the feet, with the legs, the instrument can readily be folded up, which renders it more convenient for transportation.

Having thus fully described my invention,

What I claim as new, and desire to secure by Letters Patent, is—

The hinged legs A B, provided with feet G G, pivoted thereto, in combination with the pivoted cross-bars D F and slotted piece H, having the scale S on its outer surface, all arranged, constructed, and operated in the manner and for the purpose set forth.

In testimony that I claim the foregoing as my own, I affix my signature, in presence of two witnesses.

F. A. ARCHIBALD.

Witnesses:
JOSEPH YOUNG,
LEONIDAS B. MAUND.